2,752,370

PROCESS FOR PRODUCING Δ¹⁶-20 KETO STEROIDS FROM 16-SUBSTITUTED-20-KETO STEROIDS

David H. Gould, Palisades Park, N. J., assignor to Schering Corporation, Bloomfield, N. J., a corporation of New Jersey No Drawing. Application December 26, 1950, Serial No. 202,821

23 Claims. (Cl. 260—397.4)

The present invention relates to an improved process for the production of Δ¹⁶-20 keto steriods from the corresponding compounds which are saturated in the D-ring but have at the 16-position a substituent which is convertible into hydroxyl with the aid of hydrolysis.

It is the general object of the invention to provide an improved process for the manufacture of compounds having physiological activity or capable of serving as intermediates for the manufacture of hormones and other therapeutically active steroid compounds.

More specifically, it is an object of the invention to provide a simplified procedure for splitting off from the 16-position a substituent of the type (such as ester, ether) which can be converted with the aid of hydrolysis into a hydroxyl group, thereby creating a double bond between the 16 and 17 carbons.

Other objects and advantages of the invention will appear from the following more detailed description thereof.

In the degradation of sapogenins into therapeutically active steroids, there have usually been obtained diesters, generally the diacetates, one of the ester groups being attached to the 3-carbon and the other through an alkylene carboxy group to the 16 carbon. In the effort to split off the ester group attached to the D-ring, it has been suggested in the case of diosone diacetate (Δ⁵-pregnene - 3(β),16 - diol - 20 - one - 3-acetate-16-(δ-acetoxy)-isocaproate, obtained from diosgenin after converting it into the pseudo form) to saponify the ester groups with alkali and then to effect dehydration of the hydroxy compound by refluxing with acetic anhydride. Another method that has been suggested likewise involves hydrolysis and dehydration by the use of either dilute aqueous acid or base. (Marker, J. A. C. S. 62, 3350 (1940): ibid., 3349.)

It will be apparent that in these prior procedures for splitting off the ester group from the D-ring, two steps were involved, and in addition, hydrolysis of the 3-ester group occurred simultaneously, which was generally undesirable, since the desired product is usually the 3-ester compound, so that the known procedures had to be followed by re-acylation. This obviously rendered the process more tedious and expensive and reduced the overall yield.

I have found that 20-keto steroids having at the 16-position a group convertible into hydroxyl with the aid of hydrolysis can be treated in a single step to split off such group and create a double bond between the 16 and 17 carbons to produce the corresponding 16–17 ethylenic compounds. It is preferable to employ compounds wherein the 16-substituent is an ester group, such as acetoxy, propionoxy, butyroxy, succinoxy, benzoyloxy, γ-acetoxy methyl valeroxy (δ-acetoxy-iso-caproyloxy), etc., or an ether group such as methoxy, ethoxy, benzoxy, etc., it being immaterial whether the substituent is aliphatic or cyclic in nature.

In accordance with the present invention, the ester, ether or similar group attached to the D-ring is split off along with hydrogen from the adjacent 17-carbon by heating the 20-keto steroid in an anhydrous medium to produce the 16,17-ethylenic compound. The anhydrous medium is preferably one boiling above 100° C., is used alone, so that a sufficiently high temperature can be obtained by refluxing at atmospheric pressure. The anhydrous medium may be inert in character, or it may be a more or less active splitting agent. Normally reactive substances may be employed which have no chemical action on the steroid compound, provided only that they allow the steroid to be subjected to a temperature above 100° C. However, if certain reagents, e. g. aluminum chloride, perchloric acid, etc., are used in conjunction with the liquid medium, the boiling point of the latter may be as low as 50° C.

Among the substances which I have found to exert the desired degradation or splitting action are toluene, xylene, gasoline, kerosene, acetic anhydride (alone or diluted with a neutral solvent like toluene or xylene), alkaline or acid splitting agents such as alumina, phosphorus pentoxide, phosphorus oxychloride, aluminum chloride, perchloric acid, acetic acid, etc. The liquid media, as already indicated, may be used alone, or mixed with other liquid or solid media, and the insoluble materials like alumina can be suspended in an inert medium such as a sufficiently high boiling aliphatic or aromatic hydrocarbon. The neutral solvents, like toluene and xylene, generally give the same results as chemically active agents like acetic anhydride.

The 20-keto steroids having a substituent in the 16 position can in other respects be of widely different character. Thus the group attached to the 20-carbon can be simple or relatively complex, while various substituents, such as hydroxyl and keto groups and their various derivatives or conversion groups, can be attached at various points in the cyclopentanopolyhydrophenanthrene nucleus, and such nucleus may be either saturated or unsaturated.

One important group of compounds which can be modified by the process of the present invention is the oxidation products of the pseudo-sapogenins produced for example, as described in the co-pending application of David Gould and Emanuel B. Hershberg, Serial No. 202,822, filed December 26, 1950, entitled "Process for Converting Sapogenins into Pseudo-Sapogenins," or as described in the patents to Marker, Nos. 2,352,850, 2,352,851, and 2,352,852; in Marker and Rohrmann, J. A. S. C. 61, 3592 (1939); 62, 518 (1940); and in British Patent No. 552,047. Among the oxidized pseudo-sapogenin compounds that can be subjected to the degradation of the present process are those obtained from pseudo-diosgenin (diosone), pseudo-botogenin, pseudo-ricogenin, pseudo - sarsasapogenin, pseudo - tigogenin, pseudo - chlorogenin, pseudo - hecogenin, pseudo-mannogenin, pseudo-kammogenin, pseudo-gitogenin, etc. In place of the free alcohol compounds, the acetate, propionate, benzoate, and other ester derivatives, and also ether derivatives can be employed. The 16-monoesters and ethers may be subjected to my improved process, and the 3-position may be occupied by a keto, chloro or other non-esterifiable or etherifiable group. On the other hand, where additional hydroxy groups are present, the polyesters or ethers or mixed esters, ethers, or ether-esters can be employed.

As already indicated, the products of the present invention may themselves have physiological activity or can be converted into such products. Thus, diosone diacetate (5-pregnene-3β,16-diol-20-one 3-acetate 16-(δ-acetoxy)-isocaproate may be converted into Δ¹⁶-dehydropregnenolone acetate by refluxing with acetic anhydride, alone or diluted with a neutral solvent such as toluene or xylene. The product can be converted into pregnenolone acetate by selective hydrogenation in known manner.

The invention will be further described in the following examples which are presented for purposes of illustration only:

Example 1

The oxidized mixture from 4 kg. of crude diosgenin acetate in a neutral dry benzene solution was treated with 4 liters of acetic anhydride, and the mixture was distilled until the temperature reached 135° C. The mixture was refluxed one hour and chilled to 0° C. overnight (seeded). The crystals were filtered off, washed with 20% acetic acid, and washed and sludged with cold methanol. The dried product weighed 1200 g, M. P. 169–173° C.

Example 2

A similar oxidation mixture in neutral ether solution was treated with 3.2 liters of toluene and distilled until the temperature was 105–8° C. and no more water was removed. To the solution was added 40 g. of propionic acid and the mixture was refluxed one hour. On chilling and seeding, crystals were obtained. They were filtered off, washed and sludged with methanol and dried.

Example 3

Fifty grams of diosgenin acetate were converted into pseudo-diosgenin diacetate and oxidized with chromic anhydride in known manner. The oxidation mixture was extracted with ether and the ether solution washed neutral. The ultra-violet absorption spectrum of the residue on evaporation of a small portion showed the presence of very little α,β-unsaturated ketone.

The main ether solution was concentrated and treated with 65 cc. of xylene. Distillation was continued to remove ether and water. The solution was heated at reflux (135° C.) for one hour and allowed to cool. A sample of the total residue showed the presence of about 55% of 5,16-pregnadienolone acetate according to its absorption spectrum. On chilling the solution, crystalline 5,16-pregnadien-3β-ol-20-one acetate was obtained.

Example 4

A sample of 5 g. of 16-methoxy-5-pregnen-3β-ol-20-one was dissolved in 20 cc. of acetic anhydride and treated with 2 cc. of conc. HCl. The solution was refluxed one hour. On chilling, crystals of 5,16-pregnadienolone acetate were obtained. Additional product was recovered from the mother liquor.

As indicated above, a similar procedure with the same or other high boiling solvents and/or dehydrating or splitting agents can be employed with other 20-keto steroids, including those having hydroxyl or keto groups in the 11 and/or 12-positions, the hydroxyl groups being preferably substituted as explained above.

Particularly in the case of 16-esters, there may be employed also higher boiling organic bases, like pyridine, collidine, and quinoline. In place of the petroleum fractions named above, more or less pure individual aliphatic hydrocarbons can be used, such as heptane and octane.

The following equations indicate by way of example the general course of the reactions, it being understood that the formulas of the more complex steroids, while they have found acceptance, are not represented as being absolutely correct.

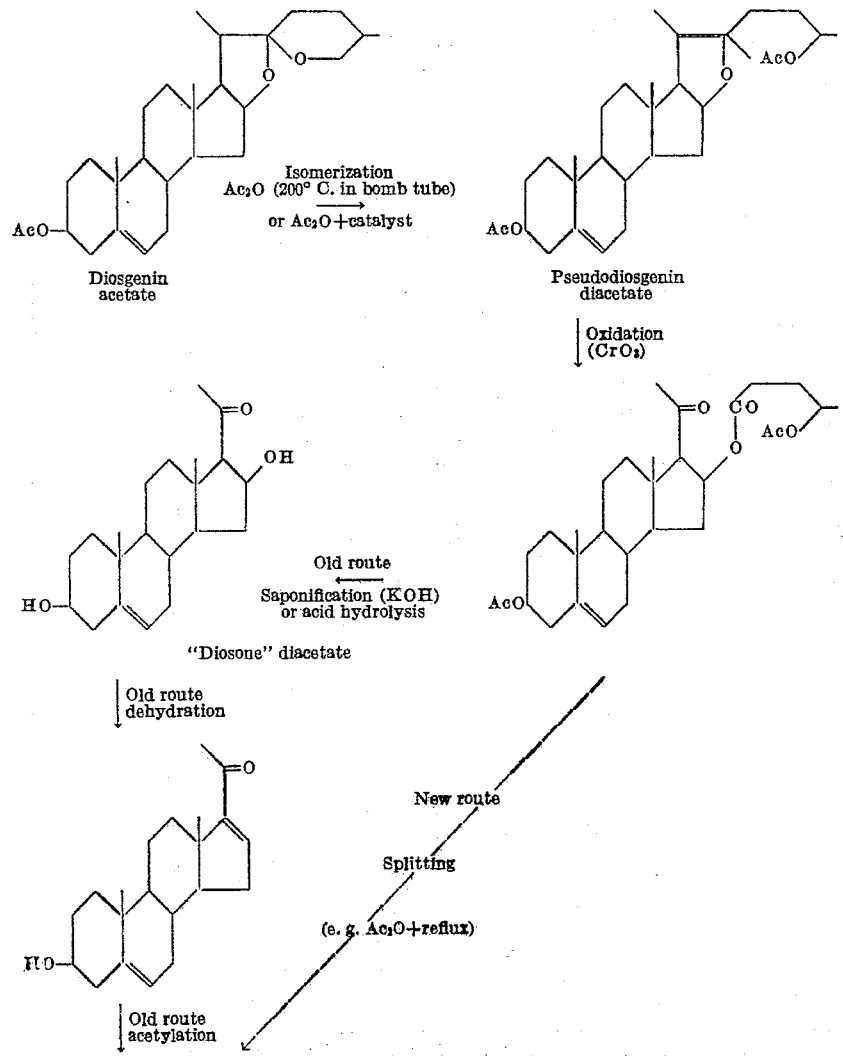

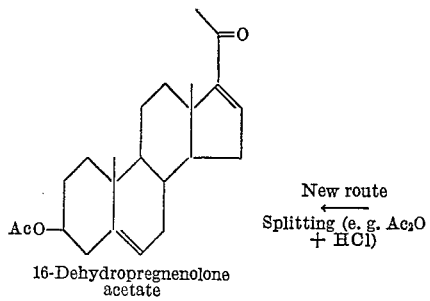 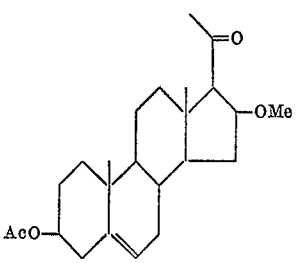

16-Dehydropregnenolone acetate  ←New route Splitting (e. g. Ac₂O + HCl)

In Example 4 hereinabove, the HCl can be replaced by another strong mineral acid which will not oxidize or otherwise decompose the steroid nucleus, such as hydrobromic and sulfuric acids.

As will be evident from the foregoing, the present process involves essentially a thermal decomposition, the catalyst, when used, operating to speed such decomposition.

It will be apparent from the foregoing that the starting compounds include those having an oxygen-containing group at the 3-position, and particularly hydroxyl and groups convertible into hydroxyl with the aid of hydrolysis, like lower alkyl ether and lower aliphatic ester groups.

I claim:

1. Process for the manufacture of $\Delta^{16}$-20-keto steroids which comprises thermally decomposing a 20-keto-steroid having in the 16-position a carboxylic organic acid ester group linked to the 16-carbon through carboxylic oxygen, by heating the same in a substantially anhydrous organic liquid medium of the group consisting of hydrocarbons, cyclic amines, and acetic acid and acetic anhydride, at temperatures above 100° C. until such group, together with hydrogen from the adjacent 17-carbon, is split off to introduce a 16,17-double bond.

2. Process according to claim 1, wherein the heating takes place at atmospheric pressure.

3. Process according to claim 1, wherein the liquid medium has a boiling point above 100° C. and the heating is conducted under reflux at atmospheric pressure.

4. Process according to claim 1, wherein the liquid medium is a hydrocarbon boiling above 100° C.

5. Process according to claim 1, wherein the liquid medium is an aromatic hydrocarbon.

6. Process according to claim 1, wherein the liquid medium comprises an acid anhydride.

7. Process according to claim 6, wherein the anhydride is organic.

8. Process according to claim 1, wherein the liquid medium contains a chloride which is acid-reacting in aqueous solution.

9. Process according to claim 1, wherein the liquid medium contains a chloride of a non-metal.

10. Process according to claim 1, wherein the liquid medium is acid reacting in aqueous solution.

11. Process according to claim 1, wherein the liquid medium is a cyclic amine.

12. Process according to claim 1, wherein the liquid medium contains a strong inorganic acid.

13. Process according to claim 1, wherein the liquid medium contains an oxy compound of phosphorus.

14. Process according to claim 1, wherein the liquid medium is a lower alkanoic acid anhydride.

15. Process according to claim 1, wherein the liquid medium is a lower alkanoic acid.

16. Process according to claim 1, wherein the liquid medium comprises acetic anhydride.

17. Process according to claim 1, wherein the liquid medium comprises acetic acid.

18. Process according to claim 1, wherein the steroid belongs to the $C_{21}$ series.

19. Process according to claim 1, wherein the 20-keto steroid starting compound has an oxygen-containing group in one of the 11- and 12-positions.

20. Process for the manufacture of $\Delta^{16}$-pregnene-3-X-20-ones, wherein X is a lower alkanoyloxy group, which comprises thermally decomposing the oxidation product of a lower alkanoic acid diester of a pseudo-sapogenin, by heating the same in a substantially anhydrous organic liquid medium of the group consisting of hydrocarbons, cyclic amines, and acetic acid and acetic anhydride, at temperatures above 100° C. until the substituent at the 16-carbon, together with hydrogen from the adjacent 17-carbon, is split off to introduce a 16,17-double bond.

21. Process for the manufacture of a $\Delta^{16}$-20-keto steroid which comprises heating 5-pregnene-3$\beta$,16 - diol-20-one 3-acetate 16-($\delta$-acetoxy)-isocaproate with acetic anhydride under reflux until the 16 - substituent is split off to form $\Delta^{16}$-dehydropregnenol-3-one-20 3-acetate.

22. Process for the manufacture of a $\Delta^{16}$-20-keto steroid which comprises heating 5-pregnene-3$\beta$,16-diol-20-one 3-acetate 16-($\delta$-acetoxy)-isocaproate with toluene until no more water is removed, adding propionic acid to the solution, and refluxing the same until the 16-substituent is split off to form $\Delta^{16}$-dehydropregnenol-3-one-20 3-acetate.

23. Process for the manufacture of 20-keto steroids unsaturated in the D-ring, which comprises heating the acylated steroid reaction product of the oxidation of the diester of a pseudo-sapogenin, with a hydrocarbon at a temperature above 100° C. under substantially anhydrous conditions until the group attached to the 16-carbon is split off and a double bond established between the 16- and 17-carbons.

References Cited in the file of this patent

UNITED STATES PATENTS

| | | |
|---|---|---|
| 2,304,837 | Marker | Dec. 15, 1942 |
| 2,352,851 | Marker | July 4, 1944 |